United States Patent [19]

Nichols et al.

[11] Patent Number: 4,754,678
[45] Date of Patent: Jul. 5, 1988

[54] METHOD AND APPARATUS FOR SHAPING PLASTIC FOAM INSULATION BOARD TO FIT ROOF CONTOURS

[75] Inventors: Wayne G. Nichols, Bay City; Allen B. Woodruff, Saginaw, both of Mich.

[73] Assignee: Kay-Jay Machines, Inc., Saginaw, Mich.

[21] Appl. No.: 68,963

[22] Filed: Jul. 1, 1987

Related U.S. Application Data

[63] Continuation of Ser. No. 885,273, Jul. 14, 1986, abandoned.

[51] Int. Cl.$^4$ ............................................. B26F 3/12
[52] U.S. Cl. ............................................. 83/874; 83/16; 83/171; 83/428; 83/433; 83/875
[58] Field of Search ................. 83/874, 875, 871, 870, 83/862, 16, 171, 432, 428, 433, 813

[56] References Cited

U.S. PATENT DOCUMENTS

| | | | |
|---|---|---|---|
| Re. 31,479 | 1/1984 | Lewis | 83/874 X |
| 2,484,619 | 10/1949 | George | 83/874 X |
| 3,242,779 | 3/1966 | Mona | 83/874 |
| 3,277,754 | 10/1966 | Lopez | 83/874 |
| 3,757,617 | 9/1973 | Fabbri | 83/171 X |
| 3,968,711 | 7/1976 | Wilson | 83/171 |
| 4,606,254 | 8/1986 | Schmalz | 83/874 X |
| 4,683,791 | 8/1987 | Demont | 83/874 |
| 4,683,792 | 8/1987 | Demont | 83/874 |

Primary Examiner—Frank T. Yost
Attorney, Agent, or Firm—Learman & McCulloch

[57] ABSTRACT

A foam board insulation shaping system and method for hot wire shaping insulation board to fit roof contours, wherein a frame mounts a transversely disposed, generally horizontal, linear wire and conveying rolls move the foam board along a longitudinal pathway past the wire, which melts the plastic as the board moves. Wire clamps secure the ends of the wire and are mounted for vertical movement, one of the wire clamps being also mounted for transverse movement relative to the frame. Yieldable mechanism associated with one of the clamps provides for expansion of the wire linearly with heating, while maintaining it under tension. A motor drives the clamps to move them vertically in unison at a predetermined speed with relation to the speed of the board. A series of transversely spaced, generally U-shaped hot wires are provided for forming grooves in the upper surface of boards, and means are provided for electrically energizing the linear wire and the U-shaped wires.

16 Claims, 4 Drawing Sheets 4,754,678

METHOD AND APPARATUS FOR SHAPING PLASTIC FOAM INSULATION BOARD TO FIT ROOF CONTOURS

This is a continuation of copending application Ser. No. 885,273, filed on July 14, 1986, now abandoned.

BACKGROUND OF THE INVENTION

This invention relates generally to readily portable, insulation board shaping machinery, and more particularly to the hot wire shaping of insulation board to fit varying roof contours. Membrane roof systems of the type which are custom fit to the particular roof in the factory, and then installed at the job site to fashion an integrated one-piece roof covering, are being sold in ever-increasing numbers as roof coverings for flat and relatively shallowly pitched roofs. Such roof systems comprise a single-ply, flexible membrane of the type wherein a polyester scrim or fabric is ensheathed between thermoplastic top and bottom layers which permit easy seam welding at the job site, where the various prefabricated pieces are assembled and joined using hot air welding techniques, and secured in position on the underlying roof.

Frequently, the underlying roof comprises a corrugated metal roof panel having parallel ribs and valleys. When such metal decks are covered, either in new or existing structures, it is desirable to utilize insulation board between the metal deck and overlying membrane to provide insulation qualities as well as a smooth surface over which the membrane may be applied. It is, moreover, necessary to provide tapered insulation boards which, for example, decrease gradually in thickness in a sloped roof from the ridge line to the outer edge of the roof. In some instances it is necessary to provide compoundly tapered boards, i.e., tapered transversely, as well as longitudinally.

The shaping of the insulation boards to fit the roof contour, in the manner required, is a task best carried on at the work site, where the dimensions are relatively easily ascertainable, and fine adjustments can be made to achieve the required fit, since underlying roof decks are usually not normally exactly dimensionally uniform in character.

The machine to perform the various shaping jobs which are necessary should be readily portable in the sense that it can be moved from work site to work site, and the machine to be described has been designed so that it can be readily transported in a pick-up truck.

SUMMARY OF THE INVENTION

One of the prime objects of the present invention is to design a machine capable of providing both corrugations and tapers that are simple or compound.

Another object of the invention is to design a machine which readily breaks down into several discrete assemblies which can be readily transported in a common pick-up truck.

Still another object of the invention is to provide a machine, of the character indicated, which is particularly suited to providing underlying insulation for mechanically fastened single-ply plastic membrane roof covering systems.

Another object of the invention is to provide a shaper for roofing contractors which can readily be set up at the job site, to provide corrugated and tapered surfaces of the dimensions required for a particular roof in a rapid and economic manner.

A further object of the invention is to provide a machine of the character described, which is readily set up to provide a compound taper, where this is required.

Still another object of the invention is to provide a machine which relatively unskilled workmen can easily operate.

Another object of the invention is to provide a machine in which a novel wire clamp assembly provides for maintaining a tension on the taper-forming hot wire, as it heats and expands, to maintain it in a truly linear taut condition, which provides the desired precision shaping required when cutting tapered contours.

Still a further object of the invention is to provide a system of the character described, which is capable of providing a variety of shapes with readily adjusted elements which are of such structure as to lend themselves to the shaping of the various contours required.

Another object of the invention is to provide a system wherein the taper-cutting wire is moved at a controlled speed correlated with the feed at which the insulation boards are moved past the hot wire element.

Other objects and advantages will become apparent by reference to the drawings, and the following specification.

IN THE DRAWINGS

Figure 2:
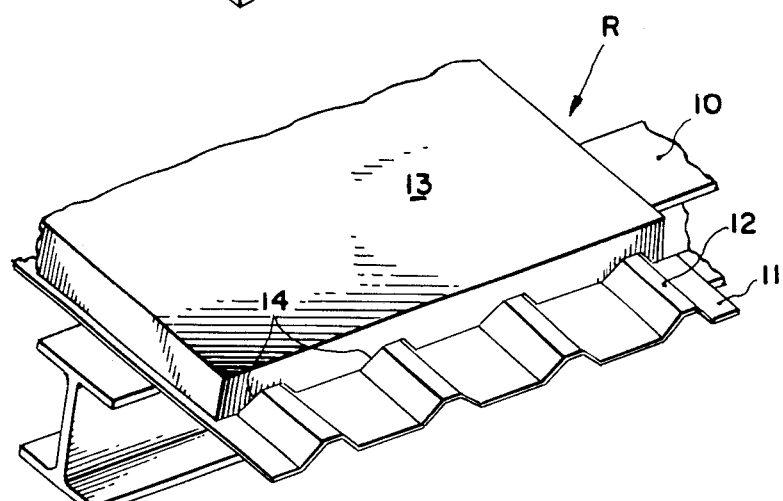
FIG. 2 is a fragmentary, isometric view illustrating the manner in which the insulation board shaped in the machine is fitted to an underlying corrugated metal deck.

Referring now more particularly to the accompanying drawings, and particularly in the first instance to FIG. 2, a portion of a roof structure, generally designated R is shown, consisting of a series of parallel purlins 10, over which a metal deck 11 is secured, deck 11, including upstanding transversely spaced apart longitudinal ribs or corrugations 12. To permit a one-piece, flat, plastic membrane to be secured in position as a roof cover, a plastic foam insulation board 13 is provided with U-shaped recesses 14, to fit the corrugations or ribs 12. Because, the board 13 must be level, it is necessary that the fit be a good one so that one side of the board 13 is not raised, for example, with respect to the other side. If the recess 14 at one side of the board is either too small or too large, one side of the board is raised with respect to the other.

Figure 1:
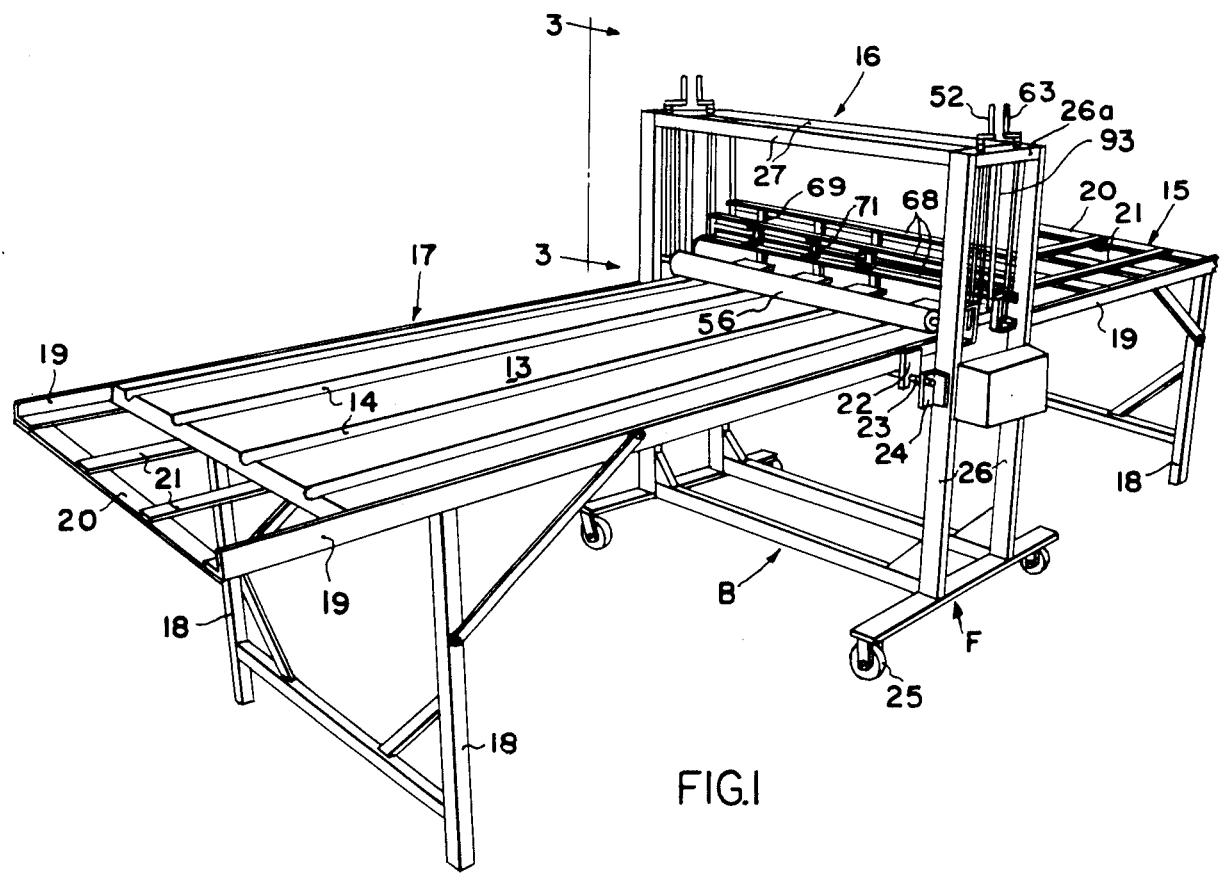
FIG. 1 is an schematic isometric, elevational view showing the machine set up and cutting parallel grooves in an elongate plastic foam insulation board which is being fed through the machine.

A machine which will permit the roofing contractor to custom-shape his insulation board at the job site, is disclosed in the remaining figures, and particularly is shown in operation in FIG. 1, cutting the recesses 14 in the plastic board 13 from end-to-end longitudinally. The portable machine disclosed comprises a demountable, entrance table or platform, generally designated 15, a central shaping unit 16, and a discharge table or platform 17. It is to be understood that the tables 15 and 17 are detachable from the central unit 16 and foldable. Briefly, each table 15 and 17 includes single leg structures 18, with decks or platforms comprising side angle members 19, connected by end members 20, which are further connected by longitudinal rails 21.

Each of the table members 15 and 17 is provided with brackets 22, which can demountably bolt, as at 23, to brackets 24 provided at the sides of the central shaping unit 16. Insulation board 13 is placed by hand, or fed by conveyor, to the infeed table unit 15, and fed through unit 16, in a manner which will be disclosed, to the discharge table 17, from which it may be manually or mechanically removed. The shaping unit 16 comprises a frame, generally designated F, which is mounted on caster wheels 25, depending from a base, generally designated B. A pair of upright columns 26 are provided at the sides of the frame F, and are connected at their upper ends by sill members 27.

Figure 3:
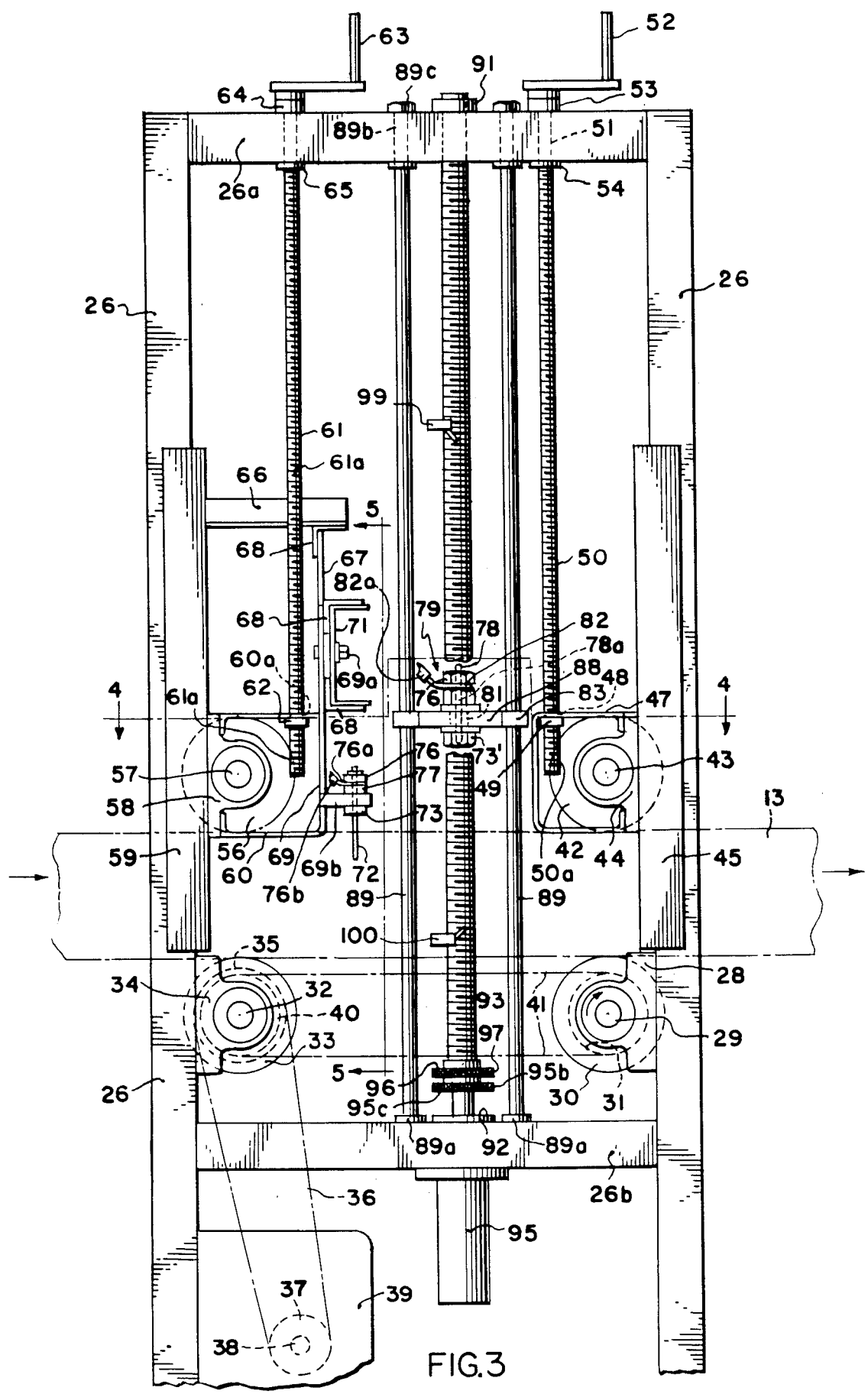
FIG. 3 is a fragmentary, side elevational view, taken on the line 3—3 of FIG. 1.

Mounted at the entrance end of the frame F, in bearings 28 (see FIG. 3) secured to the uprights 26, are the shaft ends 29 of a drive roll 30, which as FIG. 3 indicates, may be driven in the clockwise direction by a sprocket 31. At the discharge end of the frame F, the shaft ends 32 of a drive roll 33 are journaled in bearings 34 fixed to uprights 26 at each side of the machine, and it will be seen that the roll 33 is driven in the same clockwise direction of rotation via a sprocket 35. Sprocket 35 may be driven by a chain 36, via a sprocket 37 mounted on the output shaft 38 of a reversible electric motor 39. The sprocket 31 is also driven by the chain 36, via a sprocket 40, mounted on the shaft end 32, and a chain 41 which is trained around both sprocket 40 and sprocket 31.

Provided to assist drive roll 30, at the entrance end of the machine, is an upper pressure roll 42, having shaft ends 43 journaled in bearings 44, which are fixed to channel guide members 45 at each side of the machine, and move upwardly and downwardly with the guides 45 on the upright columns 26 of frame F.

Mounted on the bearing 44, at each side of the machine, is a connecting member 47 having an opening 48 under which a threaded nut 49 is fixed. The nuts 49, at each side of the machine, receive an adjusting shaft 50, which is threaded at its lower end as at 50a, and extends up through a bearing opening 51 provided in an upper connecting sill 26a. A manipulating handle 52 is provided on the upper end of each shaft 50, each shaft 50 being rotatable but axially fixed in any suitable manner by members such as collars 53 and 54.

At the discharge end of the central unit 16, a similar pressure roll 56 is provided, with its shaft ends 57 journaled in bearings 58 provided on similar, suitably mounted, channel-shaped guides 59, which embrace and guide on the uprights 26 at that end of the frame at each side. As at the entrance end, connecting members 60 are provided fixed to bearings 58, and each has an opening 60a to pass an adjusting shaft 61. A similar nut 62 is fixed to each connector 60 below each opening 60a, and it will be seen that the lower end of the shaft 61 is threaded as at 61a, such as to be actuably received by the nut 62. At its upper end each shaft 61 may be provided with a hand wheel 63 for purposes of rotating shaft 61, which is similarly restrained from movement in an axial direction by collars 64 and 65. Plainly, rotation of the shaft 61 will raise the ends of the pressure roll 56 in unison. Supports 66 are fixed to the guides 59 at each side of the machine to support cross rails 68, which connect them and extend transversely beyond them to connect with the upward extensions 67 on members 60. Mounted on the members 68 at spaced intervals, are hot wire carrying plates 69 (FIG. 5) which have vertically extending adjustment grooves 70 provided in them. Channels 71, secured in adjusted positions on the plates 69 by bolt and nut securing assemblies 69a, which extend through the grooves 70, mount the plates 69 in vertically adjusted position. On the lower ends of plates 69, are the non-conductive bars 69b from which U-shaped, hot wires 72, depend in position to form the grooves 14 in the insulation board 13. The wires 72 are of a flexible nature and can be bent to the desired shape. To maintain rigidity, it is to be observed that the channel members 71 are snugly engaged within the projecting flanges 68a of angle members 68.

Figure 5:
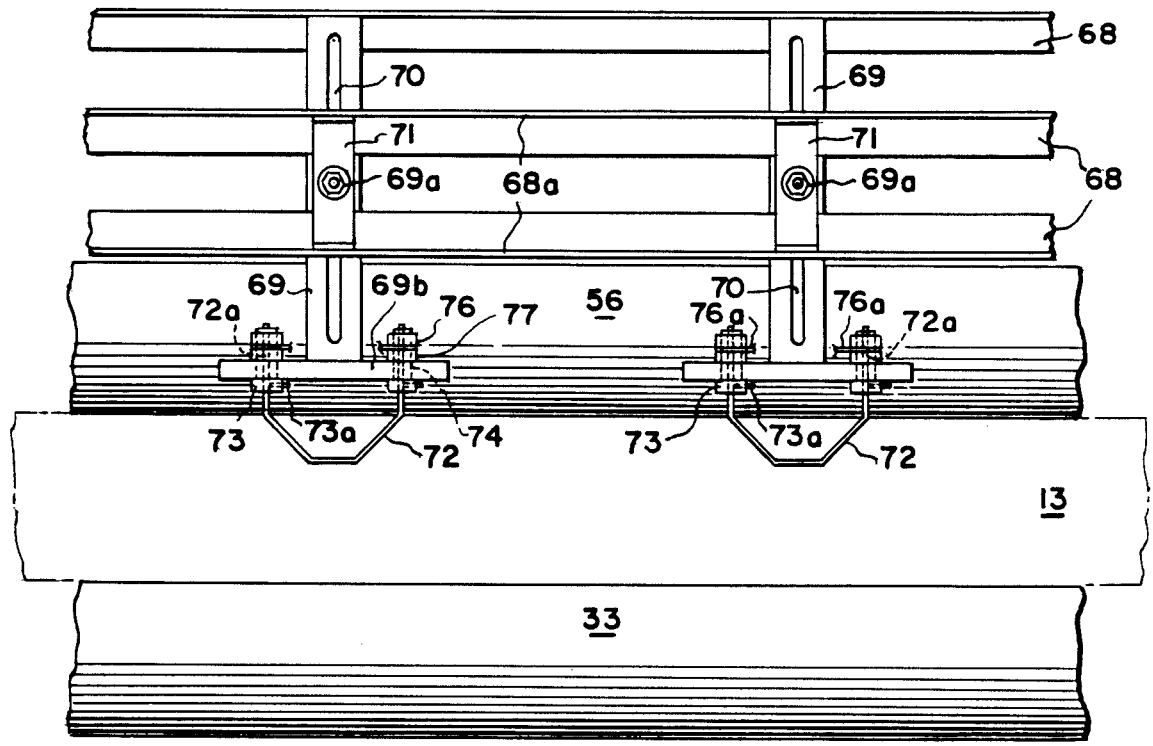
FIG. 5 is an enlarged, fragmentary transverse sectional view, taken on the line 5—5 of FIG. 3.
Figure 6:
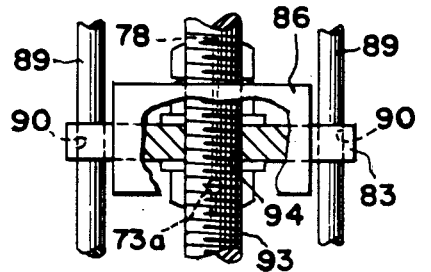
FIG. 6 is an enlarged, fragmentary, side elevational view, taken on the line 6—6 of FIG. 4.
Figure 7:
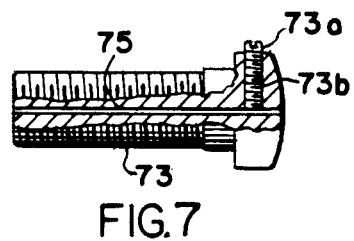
FIG. 7 is a partly sectional view of one of the wire end holding bolt members.

As FIG. 5 particularly indicates, the upper ends 72a of the U-shaped wires are secured by wire clamp bolts 73, which are threaded into elongate openings 74 (See FIG. 5) provided in the bars 69b. The bolts 73 have axial bores 75 in which the ends 72a of wires 72 are received. Nuts 76 and washers 77 can be provided to clamp the bolts 73 and terminals 76a in position and set screws 73a, provided in threaded openings 73b in the heads of the bolts 73, are provided to clamp the wire ends 72a securely in position. Insulated wires 76b lead from the terminals to a source of electrical current. Preferably, the source of electrical energy will be rheostat-controlled to provide the current necessary to resistance-heat the wires 72 to the desired temperature for melting the foam insulation board 13. It is to be emphasized that the wires 72 do not cut the board 13, but rather, melt the plastic in a continuous manner as the board 13 moves past the wires 72 at a controlled predetermined speed, so that the board 13 does not, in any manner, displace the wires 72 as it moves along, at the rate of feed provided by powered rollers 30 and 33.

Figure 4:
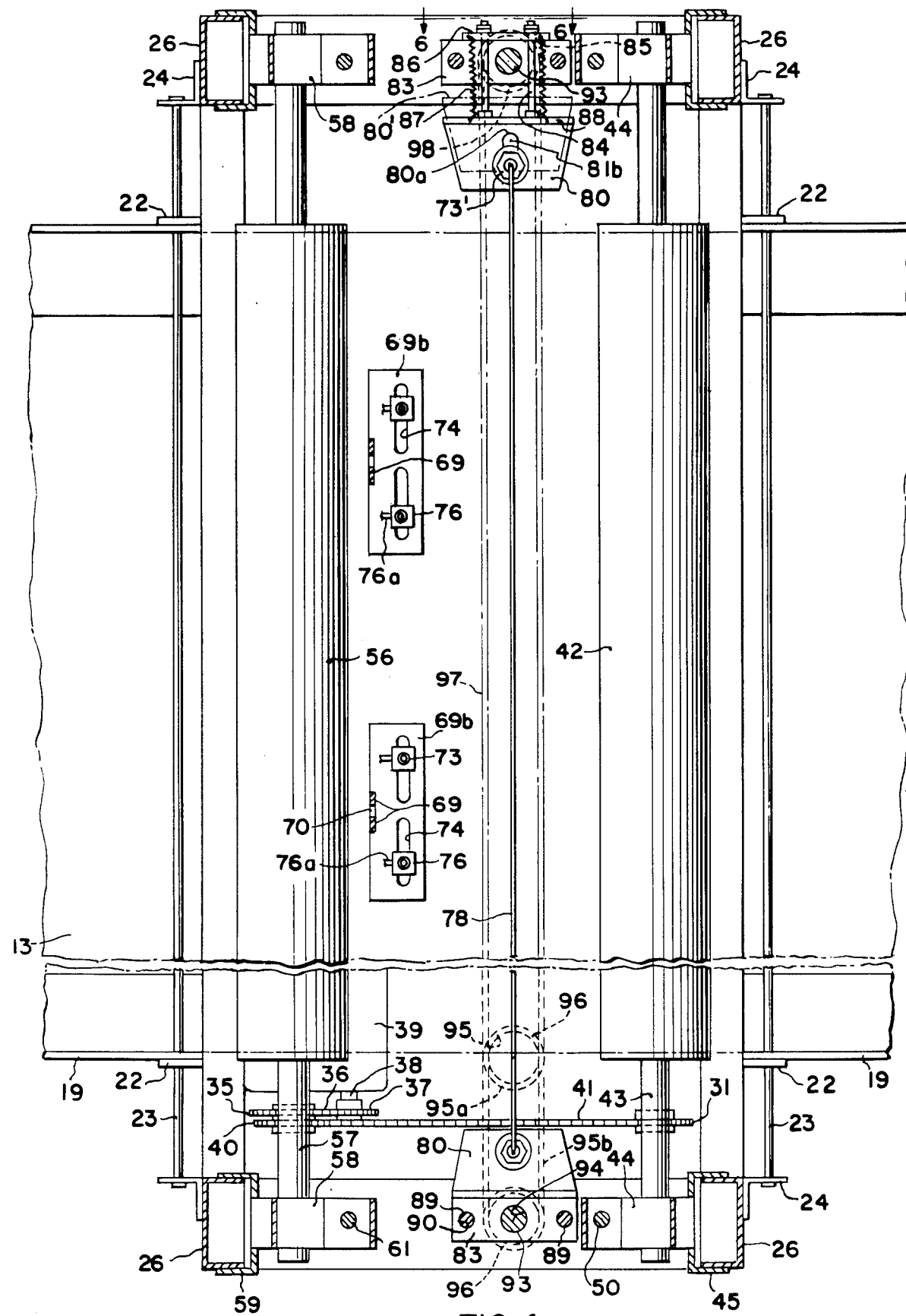
FIG. 4 is a sectional plan view, taken on the line 4—4 of FIG. 3.

In addition to the shaping wires 72, the machine provides a transverely linear, horizontal shaping wire 78 (see particularly FIGS. 3 and 4), which is mounted for vertical travel in a manner which now will be described. The ends of the wires 78 are secured by wire clamps or wire clamp assemblies, generally designated 79 which include plates 80. At one end of the machine the assemblies 79 comprise a plate 80, having a threaded opening 81 for receiving a bolt 73' of a construction identical to the bolt 73 previously described. The downturned ends 78a of wire 78 are received in the openings 75 provided in the bolts 73', and similarly secured by set screws 73a.

Also, as previously, nuts 76 clamp terminals 82 to washers 77 provided on the bolts 73', and feed wires 82a extend from the terminal 82 to a source of electrical energy for heating wire 78 to plastic board melting temperature. The opening 81b provided in one of the plates 80 is elongated, as shown at 80a at the top of FIG. 4, so that screws 73' can be fixed in a position in which wire 78 is taut. As wire 78 is heated, it has been found that it significantly expands and loses its tension. For this reason, the wire clamp assembly 79 at one side of the machine, connects the plate 80 to a second plate 83 for slideable movement relative thereto. Side posts 84, fixed to this plate 80, pass through openings 85 provided in the plate 86 securing to plate 83. Springs 87 connected to the plate 86 connect to a plate 88 which is fixed to the movable plate 80, and exert a tension which continually maintains the wire 78 taut, even though the one plate 80 has moved relatively to the plate 83 to the 80' position, as shown in broken lines. Thus, regardless of the expanded position of wire 78, the wire 78 is, at all times, maintained in a tensioned-taut condition.

Provided fixed between the frame top end rail 26a and an intermediate rail 26b, at each side of the machine, as illustrated in FIG. 3, a pair of guide rods 89 each of which pass through openings 90 provided in the clamp plate 80 at one end, and the plate 83 at the other, to be received in sockets 89a. The rods 89 extend up through openings 89b provided in the sill 26a (FIG. 3) and are secured in position by nuts 89c. Journaled in bearings 91 and 92, intermediate the guide rods 89 at each side of the machine, is a threaded drive shaft 93, which passes through a threaded opening 94 in plate 83, and in the plate 80 at the opposite side of the machine. The shafts 93 are rotatable, but axially fixed, so rotation of the shafts 93 in one direction, or the other, of rotation, operates to move the plate 83 and the plate 80 at the opposite side of the machine, upwardly and downwardly in unison to maintain the horizontal position of the wire 78.

Motor 95 is coupled to the lower end of the one drive shaft 93 by a sprocket 95a, chain 95b, and sprocket 95c, and directly drives the shaft 93 at one side of the machine. The other shaft 93 is driven by motor 95 indirectly, by a sprocket 96 via a chain 97, driving a sprocket 98 fixed to the other shaft 93. Motor 95 is a variable speed, reversible drive, electric motor, which is driven in correlation with the speed of motor 39. Limit switches 99 and 100 are provided as safety switches to limit the upward and downward movement of the plates 83 and 80 which travel on shafts 93.

THE OPERATION

In operation, if when it is desired to simply form the grooves 14 in the board 13, the operator places the foam board 13 on the table 15, and moves it to a position in which it is grasped by the pressure roll 56 and the drive roll 33. The speed of travel of the board 13 is correlated with the speed at which the wires 72 melt the plastic board. The board is fed at a rate of travel such that the flexible wires 72 are not displaced, and function to melt the plastic ahead of them as the board 13 moves, rather than to physically cut. Variously grooved sheets can be cut by loosening the bolts 72 and adjusting the vertical position of plates 69, and by adjusting the position of bolts 73 in the slots 74.

Figure 9:
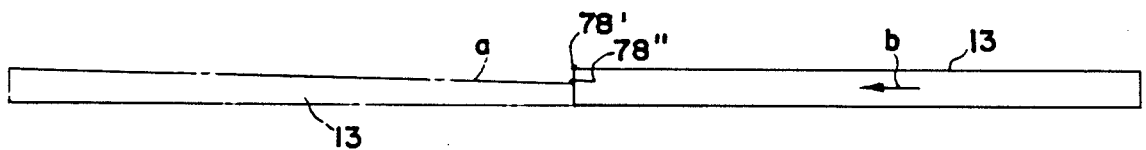
FIG. 9 is a longitudinal view of a board being cut with a longitudinal taper.

Insulation board can be cut with a taper by feeding it through the machine with the wires 72 moved to elevated position out of the path of the board 13. As shown in FIG. 9, the wire 78 can initially be placed in the position 78', and then, by energizing motor 95 and progressively lowering the wire 78 to the 78" position via revolution of screw shafts 93 as board 13 is fed longitudinally in the direction b, using hot wire 78 to shape the board 13 with the taper a. The speed of motor 95 is correlated with the speed of advance of the board 13 (the speed of motor 39), to accomplish the desired taper.

Figure 8:
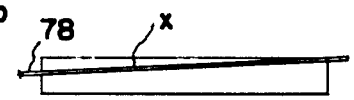
FIG. 8 is a schematic end elevation of a foam board which has been cut with a transverse taper.

The hand wheels 52 and 63 permit raising or lowering of the pressure rolls 42 and 56 to adjust to the different thicknesses of board 13 it may be desired to process. It is possible to cut transverse tapers in the manner indicated in FIG. 8 by raising one of the wire clamps 80 relative to the other. This requires the machine operator to back off the nuts 89c to permit the rods 89 at one side of the machine to be raised upwardly out of sockets 89a, and out of the openings 90 in plate 80. The plate 80 then can be manually rotated with respect to the screw shaft 93, and so raised with respect to the opposite wire clamp 80, as to dispose the wire 78 in horizontally tilted position. With the rods 89 then lowered back through the openings 90 and secured in position, movement of the board 13 will cause wire 78 to melt the plastic ahead of it and form the transverse taper x as shown in FIG. 8. A compound taper can be provided by disposing the wire 78 in horizontally tilted position to provide the transverse taper, and at the same time, driving the motor 95 to progressively lower the wire 78 and provide a longitudinal taper.

While only several embodiments of the invention have been described in detail, it will be apparent to those skilled in the art that the disclosed embodiment may be modified. Therefore, the foregoing description in all aspects is to be considered exemplary rather than limiting in any way, and the true scope of the invention is that defined in the following claims.

What is claimed is:

1. In a portable plastic foam board insulation shaper for hot wire shaping insulation board to fit roof contours and the like, the combination of elements comprising:
   a. a machine frame having sides, and an entrance end and a discharge end;
   b. board conveying means incorporated with the frame means for moving the board along a longitudinal pathway from the said entrance end to the said discharge end;
   c. a transversely disposed, generally horizontal linear wire, broadside to the said pathway mounted for movement into the path of movement of the board, and extending generally from one side of the frame to the other;
   d. vertically extending guides defining sides for the frame at each end of the wire;
   e. a pair of wire clamps for securing the ends of the wire mounted for vertical movement along the guides;
   f. means mounting one of said wire clamps for transverse movement relative to the other and said frame;
   g. yieldable means associated with said one of said clamps and wire permitting expansion of said wire linearly while maintaining it under tension;
   h. means for heat energizing the wire to bring it to plastic board melting temperature;
   i. motor means for driving said clamps to move them vertically in unison at a predetermined speed with relation to the speed of movement of said boards;
   j. transverse rail means supported by said frame;
   k. a series of transversely spaced, generally U-shaped hot wires mounted on said rail means to depend therefrom and form grooves in the upper surface of a board passing in said pathway;
   l. wire clamp means associated with the ends of said U-shaped hot wires to support them on said rail means; and
   m. means for heat energizing the U-shaped wires to bring them to plastic board melting temperatures.

2. The invention set forth in claim 1 wherein said board conveying means comprises drive roll members at the entrance and discharge ends of the frame; and motor means for powering said drive roll members.

3. The invention set forth in claim 2 wherein entrance and discharge pressure roll members are provided above each of said drive roll members axially parallel therewith; vertically extending guides are provided at each side of the machine frame at the entrance and discharge ends; and manipulatable drive means is provided for moving the pressure roll members vertically relative to the drive roll members.

4. The invention set forth in claim 3 wherein the said transverse rail means mounting said U-shaped hot wires is mounted for vertical travel along the guides at the entrance end of the machine frame with said entrance pressure roll member.

5. The invention set forth in claim 3 wherein said manipulatable drive means comprises rotatable, axially fixed screw shafts, bearings are provided for the ends of said pressure roll members, and brackets, with nuts received on said screw shafts, support said bearings and pressure roll members for veritcal travel.

6. The invention set forth in claim 1 wherein the means mounting said one wire clamp for transverse movement forms part of a wire clamp assembly comprising a base plate with a transversely extending slide guide system constituting said mounting means for said one wire clamp, on which said one wire clamp is received for transverse sliding movement; and said yieldable means comprises biasing means connected between said base plate and said one wire clamp and exerting a tension urging said one wire clamp toward the base plate.

7. The invention set forth in claim 6 wherein said biasing means comprises springs.

8. The invention set forth in claim 1 wherein said motor means includes motor driven, rotatable, vertical screw shafts journaled by said frame at each side of the machine, and nuts are fixed on said base plate and other wire clamp, which are received on said screw shafts and travel vertically when said screw shafts are driven.

9. The invention defined in claim 1 wherein said frame side guides comprise a pair of endwisely spaced guide rods extending through slide bearing openings provided in said base plate and said other wire clamp on opposite sides of each of the screw shafts.

10. The invention defined in claim 9 wherein said guide rods at one side are releasably mounted to be slid vertically out of said slide bearing openings, and releasable means is provided for releasing the ends of the wire at that side from its wire clamp to permit rotative adjustment of one wire clamp relative to the other to a vertical position out of horizontal alignment with the other to permit cutting a transverse taper.

11. The invention defined in claim 1 wherein said wire clamp means associated with the ends of said U-shaped hot wires includes bolt members having axial bores therein for receiving the ends of the U-shaped hot wires, set screws provided in the bolt members for engaging the ends of said U-shaped hot wires and fixing them in position in said bores; bars with transversely elongate slots for receiving said bolts; means for securing the upper ends of said bolts in said slots, and clamping energizing wire terminals to said bolt members, hangers with vertically extending slots fixed to said bars; and means extending through said slots for securing said hangers in adjusted position on said rail means.

12. The combination defined in claim 11 wherein said rail means includes members forming a transverse channel and said means for securing said hangers in adjusted position includes a series of channel-shaped parts fitting within said channel, and securing bolt and nut means fixed to said channel parts and extending through said vertical slots in the hanger members.

13. A method of shaping insulation board to fit roof contours in a machine having board conveying means, for moving the board to be shaped along a longitudinal pathway; a transversely disposed, generally horizontal, linear wire, broadside to the pathway in the path of movement of the board, extending generally from one side of the frame to the other; a pair of wire clamps for securing the ends of the wire mounted for guided vertical movement; means mounting one of the wire clamps for transverse movement relative to the other; means associated with the clamps for heat energizing the wire to bring it to plastic board melting temperature, and motor means for driving the clamps to move them vertically in unison; the steps of: applying an electric current to the wire to resistance heat it to board-melting temperature, while moving one of the wire clamps transversely away from the other to maintain the wire linear and taut; driving the board along the longitudinal pathway at a rate of speed such that the wire continuously melts a groove in the board ahead of the wire and, while moving the board, vertically moving the wire clamps and wire in unison at a controlled, predetermined rate of speed with respect to the movement of the board, to cut a tapered surface; and moving one of the wire clamps vertically relative to the other, before the board is fed, to dispose the wire in a horizontally inclined position and thereby form the board with a compound taper which is tapered in both the longitudinal and transverse directions.

14. A plastic foam board insulation shaper for hot wire shaping insulation board to fit roof contours and the like comprising:
  a. a machine frame having sides, bounded by an entrance end and a discharge end;
  b. board conveying means incorporated with the frame for moving the board along a longitudinal pathway from the said entrance end to the said discharge end;
  c. a transversely disposed, generally horizontal wire, broadside to the said pathway mounted for movement into the path of movement of the board, and extending generally from one side of the frame to the other;
  d. a pair of wire clamps for securing the ends of the wire having slide bearing openings therein;
  e. means for heat energizing the wire to bring it to plastic board melting temperature;
  f. motor means for driving said clamps to move them vertically in unison at a predetermined speed with relation to the speed of movement of said board, said motor means including motor driven, rotatable, vertical screw shafts journaled by said frame at each side of the machine, and nuts connected with said wire clamps, which are received on said screw shafts and travel vertically when said screw shafts are driven; and
  g. a pair of endwisely spaced guide rods at each side of the frame extending through the slide bearing openings provided in said wire clamps, on opposite sides of each of the screw shafts, said guide rods at one side of the frame being releasably mounted to be slid vertically out of said slide bearing openings, releasable means being provided for releasing the end of the wire at that side from one of said wire clamps to permit rotative adjustment of said other wire clamp on the screw shaft on which it is received to a vertical position out of horizontal alignment with the said one wire clamp.

15. The invention set forth in claim 14 wherein the means mounting said one wire clamp for transverse movement forms part of a wire clamp assembly comprising: a base plate with a transversely extending slide-guide system constituting said mounting means for said one wire clamp, on which said one wire clamp is received for transverse sliding movement; and said yieldable means comprises biasing means connected between said base plate and said one wire clamp and exerting a tension urging said one wire clamp toward the base plate.

16. The invention set forth in claim 15 wherein said biasing means comprises springs.

* * * * *